US 6,606,180 B2

(12) United States Patent
Harada

(10) Patent No.: US 6,606,180 B2
(45) Date of Patent: Aug. 12, 2003

(54) LIGHT BEAM SCANNING DEVICE

(75) Inventor: Akinori Harada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/842,044

(22) Filed: Apr. 26, 2001

(65) Prior Publication Data

US 2001/0038484 A1 Nov. 8, 2001

(30) Foreign Application Priority Data

Apr. 27, 2000 (JP) ........................................ 2000-128208

(51) Int. Cl.[7] .............................................. G02B 26/08
(52) U.S. Cl. ........................................ 359/204; 355/70
(58) Field of Search ................................ 359/204, 212, 359/216, 217, 218; 355/37, 70

(56) References Cited

U.S. PATENT DOCUMENTS

| 4,013,915 | A | * | 3/1977 | Dufft | 313/499 |
| 4,924,261 | A | * | 5/1990 | Okino | 355/35 |
| 5,612,811 | A | * | 3/1997 | Aikawa et al. | 358/509 |
| 5,949,528 | A | * | 9/1999 | Iwasaki | 355/402 |
| 5,995,195 | A | * | 11/1999 | Kodama et al. | 347/238 |
| 6,229,656 | B1 | * | 5/2001 | Omura | 359/204 |
| 6,317,246 | B1 | * | 11/2001 | Hayashi et al. | 347/239 |

FOREIGN PATENT DOCUMENTS

JP 60-14572 1/1985 ............ H04N/1/40

OTHER PUBLICATIONS

The Journal of the Institute of Television Engineers of Japan; vol. 36, No. 1; pp. 50–57 (1982).

* cited by examiner

Primary Examiner—Mark A. Robinson
(74) Attorney, Agent, or Firm—Sughrue Mion, PLLC

(57) ABSTRACT

Light sources of a light beam scanning device of the present invention are an AlGaInP semiconductor laser emitting a light beam of a wavelength of 680 nm, a GaN extremely small surface area light emitting diode (EELED) emitting a light beam of a wavelength of 530 nm, and a GaN EELED emitting a light beam of a wavelength of 470 nm. Such a structure provides a light beam scanning device which is compact, whose manufacturing cost is low, and with which light beams having light emission distributions corresponding to spectral sensitivities of a photosensitive material.

15 Claims, 5 Drawing Sheets

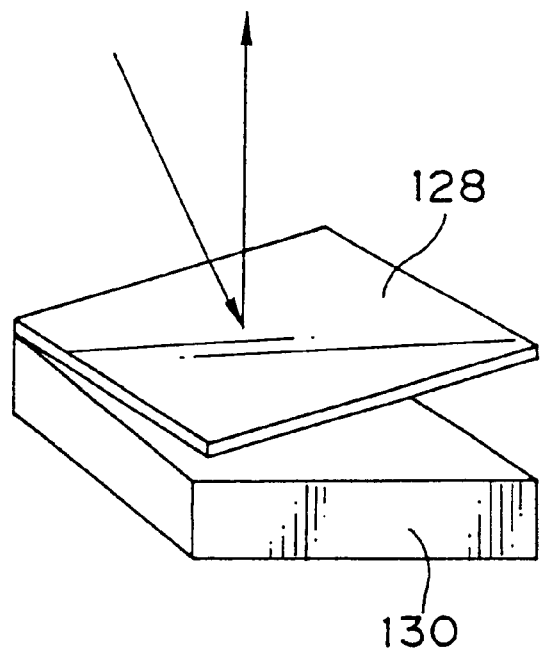
F I G. 5 A
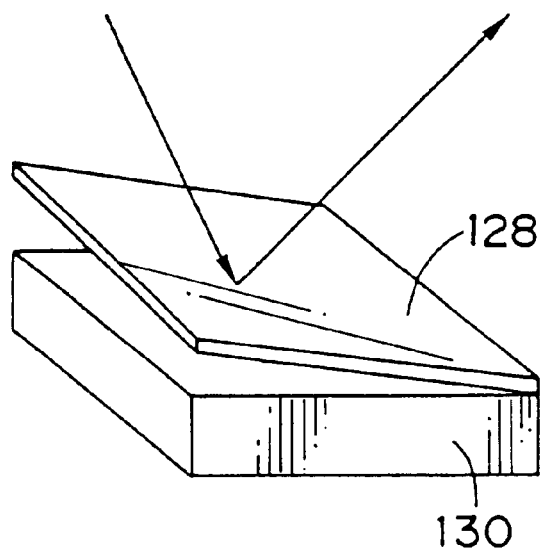
F I G. 5 B

LIGHT BEAM SCANNING DEVICE

BACKGROUND OF THE INVENTION

1. Field of the Invention

The present invention relates to a light beam scanning device, and in particular, to a light beam scanning device which scans a photosensitive material by a plurality of light beams having respectively different wavelengths which are selected in accordance with the spectral sensitivities of the photosensitive material.

2. Description of the Related Art

Conventionally, in the case of a color photosensitive material having a spectral sensitivities in the visible range (400 through 690 nm), a color image is recorded by scanning-exposing the color photosensitive material by light beams of the three colors of red, green and blue which have been modulated in accordance with the image signals of the respective colors. Here, generally, a laser light source such as a gas laser, a solid state laser (wavelength converted solid state laser) which uses light emitted by a semiconductor laser as excited light and which is equipped with a wavelength converting element, a semiconductor laser, or the like is used as the light source which emits the light beam. An appropriate laser light source is selected in accordance with the wavelength range. For example, the "The Journal of the Institute of Television Engineers of Japan", Vol. 36, No. 1, pp. 50–57 (1982) and Japanese Patent Application Laid-Open (JP-A) No. 60-14572 propose image recording devices which record a color image by scanning-exposing a color photosensitive material with light beams of three colors of red, green and blue which are emitted from respective gas lasers (an He—Ne laser having an oscillation wavelength of 632 nm, an Ar laser having an oscillation wavelength of 514 nm, and an He—Cd laser having an oscillation wavelength of 441 nm). Further, conventionally, semiconductor lasers which emit light beams of the short wavelength range have been difficult to obtain. Thus, semiconductor lasers (e.g., semiconductor lasers having an oscillation wavelength of 680 nm) have been used as laser light sources generating red light beams, and wavelength converted solid state lasers (e.g., wavelength converted solid state lasers having oscillation wavelengths of 473 nm and 532 nm) have been used as laser light sources generating green and blue light beams.

However, laser light sources other than semiconductor lasers have problems in that they are large and expensive. Further, because laser light sources other than semiconductor lasers cannot directly modulate the generated light beam, a problem arises in that the light beam must be modulated by using an external modulator such as an expensive acousto-optical modulation element (AOM) or the like. Further, in scanning optical systems using an external modulator such as an AOM or the like, the respective parts interfere with one another. Thus, a problem arises in that the angles between the optical axes of the respective light beams cannot be made small, and the device becomes large on the whole.

On the other hand, if compact and inexpensive semiconductor laser devices could be used as laser light sources which emit green and blue light beams, there would be no need for an external modulator. Thus, the entire scanning optical system could be made compact, and the manufacturing cost of the light beam scanning device could be reduced.

However, commercially available semiconductor lasers are a GaN semiconductor laser having an oscillation wavelength in a vicinity of 410 nm, an AlGaInP semiconductor laser having an oscillation wavelength of 630 to 680 nm, and an AlGa As or a GaInAsP semiconductor laser having an oscillation wavelength of 780 to 1550 nm. Only semiconductor lasers having oscillation wavelengths in these predetermined ranges can be obtained. Thus, there is the problem that scanning-exposing by light beams of desired wavelengths cannot be carried out for color photosensitive materials having spectral sensitivities in the visible range. In particular, the current situation is that, although silver halide photosensitive materials have spectral sensitivities in the 450 to 550 nm wavelength range, semiconductor lasers of oscillation wavelengths of 450 to 550 nm which emit blue and green light beams have not been put into practical use.

SUMMARY OF THE INVENTION

The present invention was developed in order to overcome the above-described drawbacks of the conventional art, and an object of the present invention is to provide a light beam scanning device which is compact and inexpensive and which can obtain light beams having light emission distributions which correspond to the spectral sensitivities of a photosensitive material.

In order to achieve the above object, a light beam scanning device of a first aspect of the present invention comprises: a plurality of light emitting elements which emit light beams of respectively different wavelengths selected in accordance with spectral sensitivities of a photosensitive material, at least one of the plurality of light emitting elements being an extremely small surface area light emitting diode whose surface area of a light emitting region is from 0.1 $\mu m^2$ to 64 $\mu m^2$; scanning means for scanning the photosensitive material by the light beams emitted from the plurality of light emitting elements.

An extremely small surface area light emitting diode is an edge emission-type light emitting diode whose light emitting region has an extremely small surface area of from 0.1 $\mu m^2$ to 64 $\mu m^2$. The light beam emitted from an extremely small surface area light emitting diode is incoherent light, and does not have strong directivity as does a laser beam. However, the light beam provides an amount of light which is required for scan-exposure. Further, the extremely small surface area light emitting diode can obtain a wide wavelength range as compared to a semiconductor laser.

As stated above, the light beam scanning device of the first aspect of the present invention is provided with an extremely small surface area light emitting diode as a light emitting element. Thus, a light beam having a light emission distribution which corresponds to the spectral sensitivity of a photosensitive material can be obtained, and the photosensitive material can be scanned by this light beam. Further, in the same way as a semiconductor laser, the extremely small surface area light emitting diode is compact and low cost, and the light beam can be directly modulated such that no expensive external modulator is required. Thus, the light beam scanning device can be made compact, and the manufacturing cost of the light beam scanning device can be reduced.

In a light beam scanning device of a second aspect of the present invention, in the first aspect, the plurality of light emitting elements are light emitting elements which can be directly modulated.

In a light beam scanning device of a third aspect of the present invention, in the first aspect, the photosensitive material is a color photosensitive material having spectral sensitivities in a visible range, and the plurality of light emitting elements are a light emitting element which emits a light beam in a blue wavelength range, a light emitting element which emits a light beam in a green wavelength range, and a light emitting element which emits a light beam in a red wavelength range.

The light beam scanning device of the third aspect of the present invention is provided with three light emitting elements which are selected in accordance with the spectral sensitivities of a color photosensitive material which has spectral sensitivities in the visible range, and which emit a light beam of the blue wavelength range, a light beam of the green wavelength range, and a light beam of the red wavelength range. An extremely small surface area light emitting diode, whose surface area of the light emitting region is from 0.1 m$^2$ to 64 $\mu$m$^2$ used for any of these light emitting elements. The scanning means scans the photosensitive material with the three color light beams emitted from the three light emitting elements including the extremely small surface area light emitting diode.

In a case in which the photosensitive material is a color photosensitive material having spectral sensitivities in the visible range, three light emitting elements are used which are selected in accordance with the spectral sensitivities and which emit a light beam in the blue wavelength range, a light beam in the green wavelength range, and a light beam in the red wavelength range. By using an extremely small surface area light emitting diode whose surface area of the light emitting region is from 0.1 $\mu$m$^2$ to 64 $\mu$m$^2$ as any of the light emitting elements, a light beam having a light emission distribution corresponding to the spectral sensitivity of the color photosensitive material can be obtained.

The light emitting element which emits a light beam in the blue wavelength range, the light emitting element which emits a light beam in the green wavelength range, and the light emitting element which emits a light beam in the red wavelength range can be structured by a combination of various light emitting elements. For example, as in the light beam scanning device of the fourth aspect of the present invention, the light emitting element which emits a light beam in a blue wavelength range and the light emitting element which emits a light beam in a green wavelength range are light emitting elements which are formed by GaN semiconductor materials.

In the light beam scanning devices of the fifth and sixth aspects of the present invention, in the third aspect, the light emitting element which emits a light beam in a blue wavelength range is an extremely small surface area light emitting diode, the light emitting element which emits a light beam in a green wavelength range is a wavelength converted solid state laser, and the light emitting element which emits a light beam in a red wavelength range is a semiconductor laser; and the light emitting element which emits a light beam in a blue wavelength range is an extremely small surface area light emitting diode, the light emitting element which emits a light beam in a green wavelength range is a second harmonic generation laser, and the light emitting element which emits a light beam in a red wavelength range is a semiconductor laser. Here, a laser, which uses light emitted by a semiconductor laser as excited light and which has a wavelength converting element for converting the excited light into a second harmonic, may be used as the second harmonic generation laser. A waveguide type wavelength converting element having a periodic domain reversing structure is suitably used as the wavelength converting element which converts the excited light into a second harmonic.

In the light beam scanning device of the seventh aspect of the present invention, in the third aspect, the light emitting element which emits a light beam in a blue wavelength range is a GaN semiconductor laser, the light emitting element which emits a light beam in a green wavelength range is an extremely small surface area light emitting diode, and the light emitting element which emits a light beam in a red wavelength range is a semiconductor laser.

In the light beam scanning device of the eighth aspect of the present invention, in the third aspect, the light emitting element which emits a light beam in a blue wavelength range and the light emitting element which emits a light beam in a green wavelength range are extremely small surface area light emitting diodes, and the light emitting element which emits a light beam in a red wavelength range is a semiconductor laser.

In the light beam scanning device of the ninth aspect of the present invention, in the fourth aspect, the light emitting element which emits a light beam in a blue wavelength range and the light emitting element which emits a light beam in a green wavelength range are edge emission-type light emitting diodes, and the light emitting element which emits a light beam in a red wavelength range is a semiconductor laser.

In the light beam scanning device of the tenth aspect of the present invention, in the first aspect, the photosensitive material is a silver halide photosensitive material. A silver halide photosensitive material has spectral sensitivities in the wavelength range of 450 to 550 nm. However, the current situation is that a semiconductor laser emitting a light beam of an oscillation wavelength of 450 nm to 550 nm has not been put into practical use. However, an extremely small surface area light emitting diode which emits a light beam in this wavelength range can be obtained. Thus, by using an extremely small surface area light emitting diode for the light emitting element which emits a light beam in this wavelength range, a light beam which corresponds more to the spectral sensitivity of a silver halide photosensitive material can be scanned.

BRIEF DESCRIPTION OF THE DRAWINGS

FIGS. 5A and 5B are diagrams for explaining operation of a micromirror forming the micromirror array.

DETAILED DESCRIPTION OF THE PREFERRED EMBODIMENT

An embodiment of a light beam scanning device of the present invention will be described in detail hereinafter with reference to the drawings.

Figure 1:
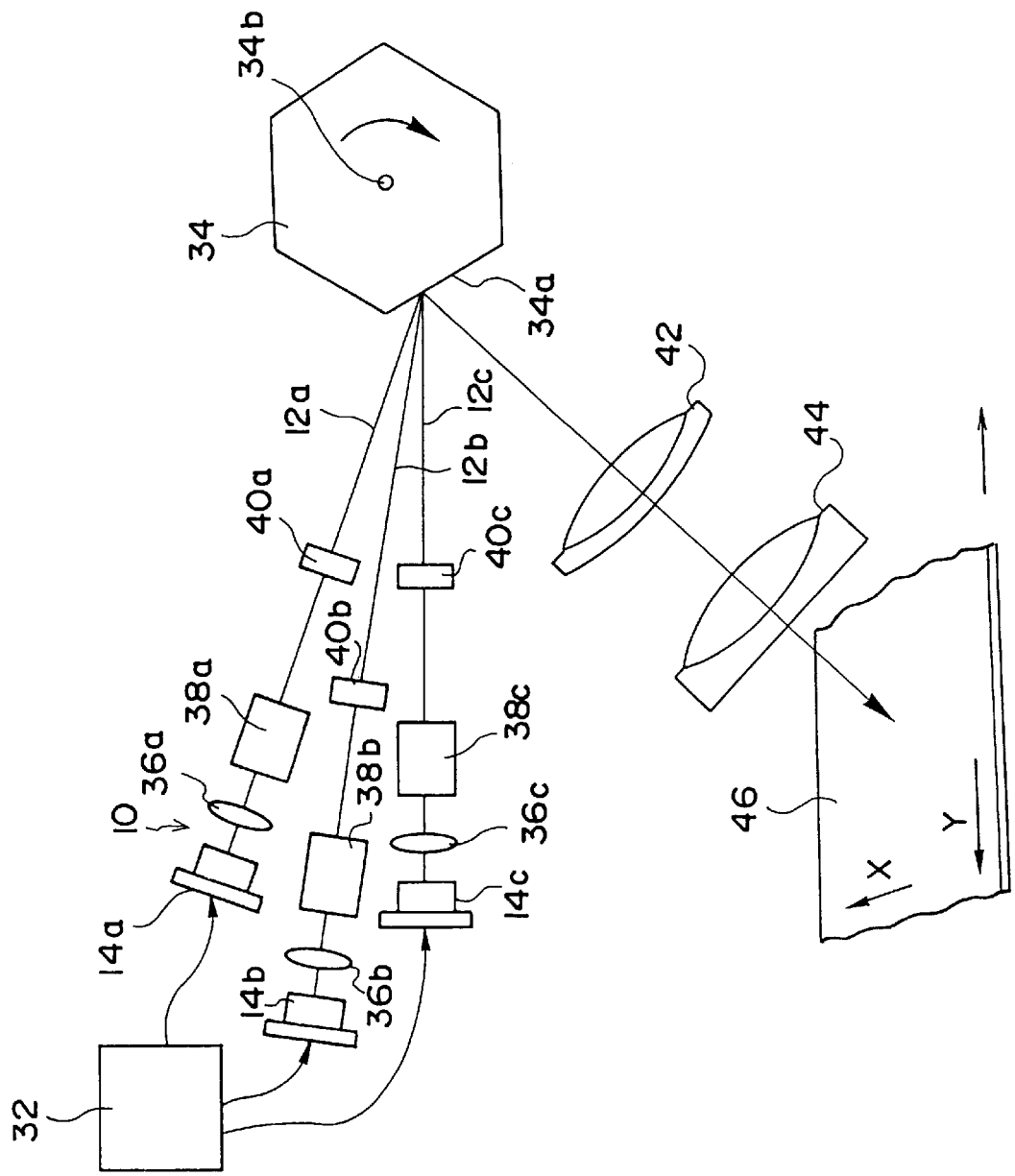
FIG. 1 is a schematic view showing a structure of a scanning optical system of a light beam scanning device of an embodiment of the present invention.

FIG. 1 is a schematic structural view of a scanning optical system relating to an embodiment of the light beam scanning device of the present invention. The scanning optical system relating to the present embodiment is equipped with a light source section 10 having light emitting elements 14*a*, 14*b*, 14*c*, and a polygon mirror 34 serving as a scanning means. Between the polygon mirror 34 and the respective light emitting elements 14*a*, 14*b*, 14*c* of the light source section 10 are provided collimator lenses 36a, 36b, 36c which make the light beams into parallel light, beam correction optical systems 38a, 38b, 38c for reshaping the beam configurations, and cylindrical lenses 40a, 40b, 40c for compensating for pyramidal angle error. Further, an fθ lens 42 and a lens group 44 of cylindrical lenses or the like are disposed in the direction in which light is reflected by the polygon mirror 34.

The light emitting element 14a forming the light source section 10 is an AlGaInP semiconductor laser emitting a light beam 12a of a wavelength of 680 nm. The light emitting element 14b is a GaN edge emission type light emitting diode (EELED) which is a single light emitting diode having an extremely small surface area which emits a light beam 12b of a wavelength of 530 nm. The light emitting element 14c is a GaN EELED emitting a light beam 12c of a wavelength of 470 nm. The light emitting elements 14a, 14b, 14c are connected to a modulation drive circuit 32. The feature of the scanning optical system relating to the present embodiment resides in the use of EELEDs as light emitting elements as described above. Note that, in the present embodiment, a silver halide color photosensitive material having three photosensitive layers having spectral sensitivity peaks at wavelengths of 470 nm, 530 nm, 680 nm which are in the visible range, is used as a color photosensitive material 46 which will be described later.

The EELEDs forming the light emitting elements 14b and 14c are edge emission-type light emitting diodes having a light emitting region of an extremely small surface area of 0.1 $\mu m^2$ to 64 $\mu m^2$. If the surface area of the light emitting region exceeds 64 $\mu m^2$ (8 $\mu m \times 8$ $\mu m$), a magnifying optical system cannot be used, and when the scanning optical system is assembled, the light amount and the scanning width needed for scanning-exposure cannot be ensured. On the other hand, manufacture of an EELED having a surface area of the light emitting region of less than 0.1 $\mu m^2$ (1 $\mu m \times 0.1$ $\mu m$) is difficult, and if the surface area of the light emitting region is less than 0.1 $\mu m^2$ (1 $\mu m \times 0.1$ $\mu m$) the light amount required for scanning-exposure cannot be obtained.

Figure 2:
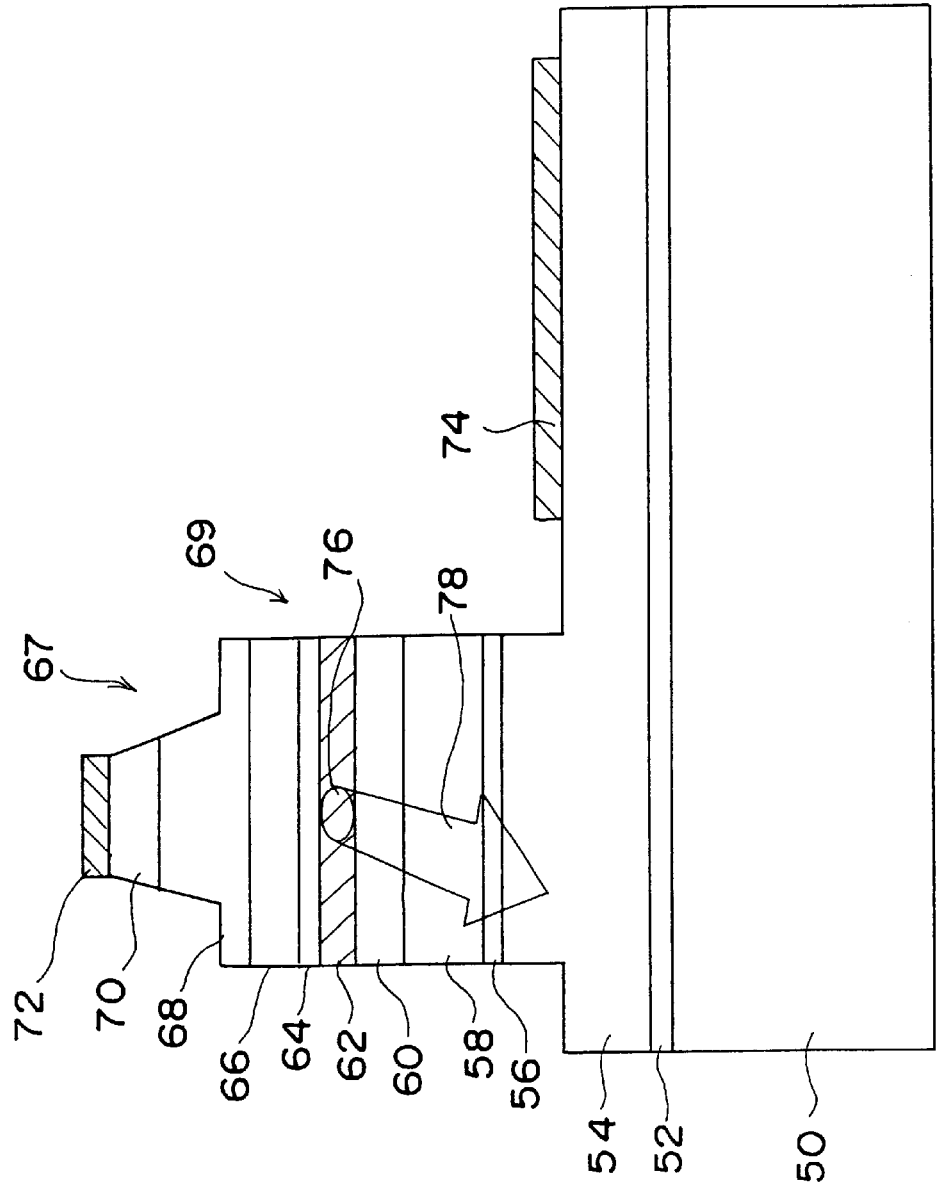
FIG. 2 is a schematic view showing a structure of an extremely small surface area light emitting diode.

FIG. 2 illustrates the structure of the GaN EELED which emits a light beam of a wavelength of 530 nm and forms the light emitting element 14b, and the GaN EELED which emits a light beam of a wavelength of 470 nm and forms the light emitting element 14c. In the same way as a GaN semiconductor laser having an oscillation wavelength of 410 nm, this EELED is manufactured by the following method.

First, using an MOCVD method, a GaN buffer layer 52 is grown at a low temperature (550° C.) on a (0001) sapphire substrate 50. An n-GaN contact layer 54, an n-InGaN crack preventing layer 56, an n-AlGaN clad layer 58, and an n-GaN guide layer 60 are grown in that order on the GaN buffer layer 52 at a high temperature (1000° C.). An InGaN multiple quantum well (MQW) layer 62 is grown as a light emitting layer on the n-GaN guide layer 60. Here, by appropriately varying the composition of the quantum well layer which is the light emitting layer, light beams of blue light (450 to 480 nm) and green light (520 to 550 nm) can be emitted.

Next, on the InGaN multiple quantum well layer 62, a p-AlGaN clad layer 64, a p-GaN guide layer 66, a p-AlGaN clad layer 68, and a p-GaN contact layer 70 are grown in that order. Note that each layer is doped with Si as an n-type impurity and Mg as a p-type impurity. In order to make the Mg doped layers have lower resistance, after crystal growth, heating and annealing are carried out at 700° C. in a nitrogen atmosphere.

Next, the p-AlGaN clad layer 68 is etched part-way through, such that a ridge structure 67 having a ridge stripe of a width of 2 $\mu m$ is formed. Thereafter, etching is carried out until the n-GaN contact layer 54 is exposed, and a mesa structure 69 having an edge stripe of a width of 4 $\mu m$ is formed. Then, a p-side electrode 72 having an Ni/AuTi/Al three-layer structure is formed on the p-GaN contact layer 70, and an n-side electrode 74 having an Ni/AuTi/Al three-layer structure is formed on the exposed portions of the n-GaN contact layer 54. Lastly, the end surfaces are formed by cleavage, and the structure is separated into the respective chips, and the end surfaces are protected by a dielectric coating. Thereafter, the chips are fixed to heat sinks, and wiring by wire bonding is carried out.

When the EELED formed as described above is driven at, for example, a drive current of 20 mA, a light beam 78 is emitted from an extremely small light emitting region 76 of 2.0 $\mu m \times 2.5$ $\mu m$, and a light output of 0.2 mW is obtained.

Next, image recording with the scanning optical system of the present embodiment will be described.

Image signals of respective colors, which are modulated by analog signals, are inputted to the modulation drive circuit 32. On the basis of the image signals, the light emitting elements 14a, 14b, 14c of the light source section 10 are respectively driven, and the light beams 12a, 12b, 12c emitted from the light emitting elements are directly modulated. A known method such as intensity modulation, pulse width modulation, pulse number modulation, or the like, can be appropriately used as the modulating method.

After the directly modulated light beam 12a has been made into parallel light by the collimator lens 36a, the beam shape thereof is reshaped by the beam correcting optical system 38a. Due to the cylindrical lens 40a, the light beam 12a is collected in only one direction such that line images are connected on a reflecting mirror surface 34a of the polygon mirror 34, and the light beam 12a is made incident on the polygon mirror 34. A rotating shaft 34b of the polygon mirror 34 is connected to the drive shaft (not shown) of a motor, and the polygon mirror 34 is rotated at high speed by the driving of the motor. The light beam 12a is reflected and deflected by the polygon mirror 34 which rotates at high speed. Note that the light beam 12a is collected by the cylindrical lens 38 as described above, and the pyramidal angle error of the polygon mirror 34 is compensated for.

The deflected light beam 12a passes through the fθ lens 42, is collected in the main scanning direction by the lens group 44 of cylindrical lenses or the like, and is made incident on the color photosensitive material 46, and the color photosensitive material 46 is main scanned in the direction of arrow X. The color photosensitive material 46 is conveyed and subscanned in the direction of arrow Y, which is orthogonal to the main scanning direction, at a predetermined speed by the driving force of a driving means (not shown), such that the color photosensitive material 46 is scanned two-dimensionally. The light beam 12b and the light beam 12c are similarly collected in the main scanning direction and made incident on the color photosensitive material 46, such that the color photosensitive material 46 is scanned twodimensionally. In this way, the color photosensitive material 46 is exposed in accordance with the image signals of the respective colors, and a color image is recorded thereon. The silver halide color photosensitive material used in the present embodiment is provided with three photosensitive layers having spectral sensitivity peaks at wavelengths of 470 nm, 530 nm, 680 nm which are in the visible range. It is preferable that main scanning is carried out by using light beams of respective wavelengths of 470 nm, 530 nm, 680 nm corresponding to these spectral sensitivity peaks. However, it is difficult to obtain semiconductor lasers having oscillation wavelengths of 470 nm, 530 nm. Conventionally, wavelength converted solid state lasers or gas lasers having oscillation wavelengths of 473 nm and 532 nm were used as light sources for emitting light beams of 470 nm, 530 nm. In the scanning optical system of the present embodiment, by using EELED5 having oscillation wavelengths of 470 nm, 530 nm, a silver halide color photosensitive material can be scanned by light beams of wavelengths of 470 nm, 530 nm which correspond to the spectral sensitivities of the silver halide color photosensitive material. Namely, light emitting elements which emit light beams of wavelengths which cannot be obtained with semiconductor lasers, can be obtained by EELEDs, and a photosensitive material can be scanned by light beams corresponding to the spectral sensitivities of the photosensitive material.

The silver halide color photosensitive material used in the present embodiment is provided with three photosensitive layers having spectral sensitivity peaks at wavelengths of 470 nm, 530 nm, 680 nm which are in the visible range. It is preferable that main scanning is carried out by using light beams of respective wavelengths of 470 nm, 530 nm, 680 nm corresponding to these spectral sensitivity peaks. However, it is difficult to obtain semiconductor lasers having oscillation wavelengths of 470 nm, 530 nm. Conventionally, wavelength converted solid state lasers or gas lasers having oscillation wavelengths of 473 nm and 532 nm were used as light sources for emitting light beams of 470 nm, 530 nm. In the scanning optical system of the present embodiment, by using EELEDs having oscillation wavelengths of 470 nm, 530 nm, a silver halide color photosensitive material can be scanned by light beams of wavelengths of 470 nm, 530 nm which correspond to the spectral sensitivities of the silver halide color photosensitive material. Namely, light emitting elements which emit light beams of wavelengths which cannot be obtained with semiconductor lasers, can be obtained by EELEDs, and a photosensitive material can be scanned by light beams corresponding to the spectral sensitivities of the photosensitive material.

Further, in the scanning optical system of the present embodiment, the light emitting elements are formed by semiconductor lasers and EELEDs. In the same way as a semiconductor laser, an EELED is small and inexpensive. Because direct modulation is possible, an expensive external modulator is not needed. The scanning optical system can be made extremely compact, and the manufacturing cost of the overall scanning optical system can be reduced.

In the above-described present embodiment, an example is described in which the light source section is formed by an AlGaInP semiconductor laser which emits a light beam of a wavelength of 680 nm, a GaN EELED which emits a light beam of a wavelength of 530 nm, and a GaN EELED which emits a light beam of a wavelength of 470 nm, and a silver halide color photosensitive material having three photosensitive layers having spectral sensitivity peaks at wavelengths of 470 nm, 530 nm, 680 nm is scan-exposed. However, it suffices for the light emitting elements to include at least an EELED, and the combination of light emitting elements can be appropriately varied in accordance with the type of photosensitive material and the like.

A laser light source such as a semiconductor laser, a gas laser (e.g., an He—Ne laser or an argon laser), or the like may be used as a light emitting element other than an EELED. Further, in a case in which a laser light source of a desired wavelength cannot be obtained by a solid state laser or a semiconductor laser, a wavelength converted solid state laser may be used in which a solid state laser crystal is used as the laser medium and the laser medium is excited by a semiconductor laser and which is provided in a solid state laser resonator with a bulk second harmonic generation (SHG) element which has a periodic domain reversing structure, or a second harmonic generation (SHG) laser may be used in which the laser beam emitted from a semiconductor laser is wavelength-converted into a second harmonic by a waveguide-type SHG element having a periodic domain reversing structure. A semiconductor laser is preferable from the standpoint that direct modulation is possible. Further, it is preferable to use light emitting elements which are formed by GaN semiconductor materials as the light emitting element which emits a light beam in the blue wavelength range and the light emitting element which emits a light beam in the green wavelength range.

In particular, a color photosensitive material having spectral sensitivities within the visible range is provided with a blue-sensitive photosensitive layer which is sensitive to light in the blue wavelength range, a green-sensitive photosensitive layer which is sensitive to light in the green wavelength range, and a red-sensitive photosensitive layer which is sensitive to light in the red wavelength range. The spectral sensitivities of the three photosensitive layers are such that the spectral sensitivity of the blue-sensitive photosensitive layer is the highest, the spectral sensitivity of the green-sensitive photosensitive layer is lower, and the spectral sensitivity of the red-sensitive photosensitive layer is the lowest. Thus, when such a color photosensitive material is scan-exposed, it is preferable to use light sources which provide light beams of intensities which increase in the order of blue to green to red such that an EELED having the smallest output is used as the blue light source, a wavelength converted solid state laser or an SHG laser having a higher output is used for the green light source, and a semiconductor laser of an even higher output (e.g., a semiconductor laser having an oscillation wavelength of 680 nm) is used as the red light source. In a case in which a wavelength converted solid state laser or an SHG laser is used as the green light source, the green light source is large, and thus, in order to make the angles between the optical axes of the respective light sources small, it is preferable to dispose the blue light source and the red light source at the sides of the green light source.

Further, a combination in which a semiconductor laser (e.g., a semiconductor laser having an oscillation wavelength of 410 nm) is used as the blue light source, an EELED is used as the green light source, and a semiconductor laser (e.g., a semiconductor laser having an oscillation wavelength of 680 nm) is used as the red light source, is also suitable.

In the above-described embodiment, an example is described in which the scanning optical system uses a polygon mirror as the scanning means. However, the scanning means is not limited to a scanning means which reflects and scans a light beam from a light source by a mirror. A light source itself may be used as a scanning means by moving the light source as a unit to effect scanning. Further, instead of a polygon mirror, a galvano mirror or a micromirror array may be used. A micromirror array is provided with a large number of extremely small mirrors whose respective reflecting angles can be adjusted. By adjusting the reflecting angles of the extremely small mirrors forming the array on the basis of an image signal, the light beam is reflected two-dimensionally and two-dimensional scanning is carried out.

Figure 3:
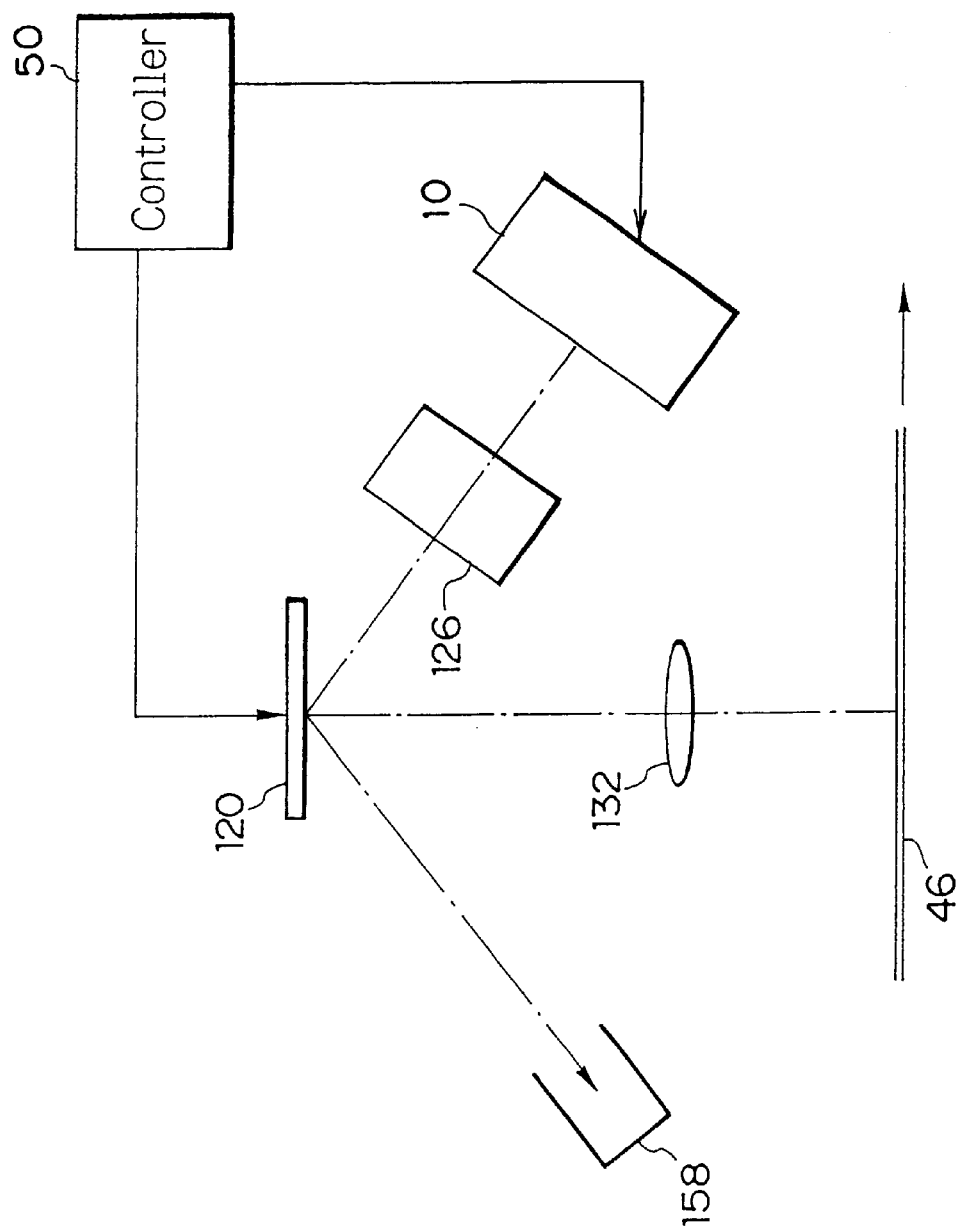
FIG. 3 is a perspective view showing a modified example of a scanning optical system of the light beam scanning device of an embodiment of the present invention.

For example, an example of a scanning optical system using a micromirror array in place of a polygon mirror is shown in FIG. 3. In the scanning optical system illustrated in FIG. 3, a diffusion box 126 which diffuses light is disposed at the light emitting side of the light source section 10. A micromirror array 120 is disposed at the light exiting side of the diffusion box 126. Further, a light absorbing body 158 is disposed in the direction in which the light diffused by the diffusion box is reflected by a micromirror 128 which is in an off state as will be described later.

Figure 4:
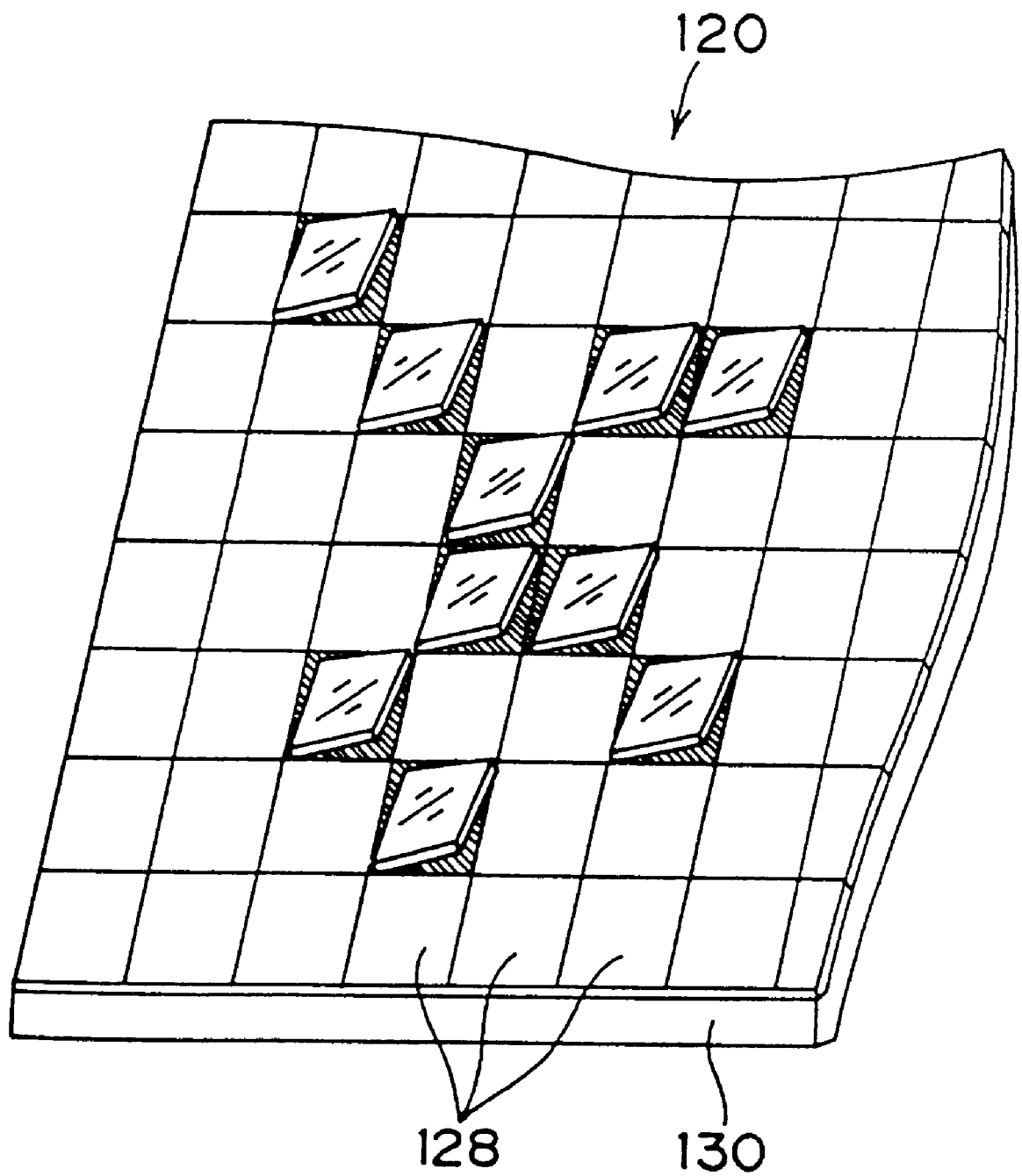
FIG. 4 is a partial enlarged view showing a structure of a portion of a micromirror array.

As shown in FIG. 4, at the micromirror array 120, the extremely small mirrors (micromirrors) 128 are disposed so as to be supported by supports on an SRAM cell (memory cell) 130. The micromirror array 120 is a mirror device in which a large number of pixels (from several hundreds of thousands to several millions of pixels) are arrayed in a grid-like arrangement. To explain each pixel, as illustrated in FIG. 4, the micromirror 128 supported by a support is provided at the uppermost portion, and aluminum is deposited on the surface of the micromirror 128. Note that the reflectance of the micromirror is 90% or more. Further, the SRAM cell 130 of a CMOS of a silicon gate, which is manufactured on a regular assembly line for semiconductor memories, is disposed directly beneath the micromirror 128 via a support which includes a hinge and a yoke. The entire micromirror array 120 is monolithic (is formed integrally).

At the micromirror array 120, when a digital signal is written to the SRAM, the micromirror 128 supported by the support is tilted around a diagonal line within a range of $\pm\alpha°$ (e.g., $\pm10$) with respect to a substrate side at which the micromirror 120 is disposed, such that the direction in which the light is reflected is changed. Namely, by on-off controlling each of the micromirrors 128, the micromirrors 128 are inclined by $\pm\alpha°$. Thus, the micromirror array 120 can be used as a light switch. Note that FIG. 5A illustrates a state in which the micromirror 128 is tilted by $+\alpha°$ which is the on state, and FIG. 5B illustrates a state in which the micromirror 128 is tilted by $-\alpha°$ which is the off state.

Accordingly, by controlling the inclinations of the micromirrors 128 at the respective pixels of the micromirror array 120 in accordance with image signals as illustrated in FIG. 4, the light incident on the micromirror array 120 is reflected in the directions in which the respective micromirrors 128 are tilted. Note that FIG. 4 shows an example in which a portion of the micromirror array 120 is enlarged, and is a state in which the micromirrors are controlled to $+\alpha°$ or $-\alpha°$.

The on-off control of the respective micromirrors 128 is carried out by a controller 50 which is connected to the micromirror array 120. Further, a collecting lens 132, which focuses on the recording surface of the color photosensitive material 46 the light reflected by the micromirror array 120, is disposed on the optical axis of the light reflected in the direction of the photosensitive material 46 by the micromirror array 120.

In the scanning optical system, an amount of exposure is computed by the controller 50 on the basis of the inputted image signal, and the respective micromirrors 128 are on-off controlled on the basis of the computed amount of exposure. The greater the amount of exposure, the longer the period of time during which the micromirror 128 is on at this time. Further, the light, which is outputted from the light source section 10 and is inputted to the micromirror array 120 via the diffusion box 126, is reflected by the micromirror array 120 toward the color photosensitive material 46 in a case in which the micromirrors 128 are on, and is reflected by the micromirror array 120 toward the light absorbing body 158 in a case in which the micromirrors 128 are off. The light reflected toward the color photosensitive material 46 is converged on the recording surface of the color photosensitive material 46 by the collecting lens 132, and the color photosensitive material 46 is exposed from the recording layer side thereof.

When a micromirror array provided with a large number of extremely small mirrors is used as the scanning optical system in this way, the photosensitive material can be scanned-exposed by adjusting the reflecting angles of the extremely small mirrors on the basis of image signals. There is no need to use a complex optical system provided with a polygon mirror or the like. The scanning optical system can be made compact, and scan-exposure can be carried out at high speed.

What is claimed is:

1. A light beam scanning device comprising:
   a plurality of light emitting elements which emit light beams of respectively different wavelengths selected in accordance with spectral sensitivities of a photosensitive material, at least one of the plurality of light emitting elements being an extremely small surface area light emitting diode whose surface area of light emitting region is from 0.1 $\mu m^2$ to 64 $\mu m^2$; and
   scanning means for scanning the photosensitive material by the light beams emitted from the plurality of light emitting elements.

2. A light beam scanning device according to claim 1, wherein the plurality of light emitting elements are light emitting elements which can be directly-modulated.

3. A light beam scanning device according to claim 1, wherein the photosensitive material is a color photosensitive material having spectral sensitivities in a visible range, and the plurality of light emitting elements are a light emitting element which emits a light beam in a blue wavelength range, a light emitting element which emits a light beam in a green wavelength range, and a light emitting element which emits a light beam in a red wavelength range.

4. A light beam scanning device according to claim 3, wherein the light emitting element which emits a light beam in a blue wavelength range and the light emitting element which emits a light beam in a green wavelength range are light emitting elements which are formed by GaN semiconductor materials.

5. A light beam scanning device according to claim 4, wherein the light emitting element which emits a light beam in a blue wavelength range and the light emitting element which emits a light beam in a green wavelength range are edge emission-type light emitting diodes, and the light emitting element which emits a light beam in a red wavelength range is a semiconductor laser.

6. A light beam scanning device according to claim 3, wherein the light emitting element which emits a light beam in a blue wavelength range is an extremely small surface area light emitting diode, the light emitting element which emits a light beam in a green wavelength range is a wavelength converted solid state laser, and the light emitting element which emits a light beam in a red wavelength range is a semiconductor laser.

7. A light beam scanning device according to claim 3, wherein the light emitting element which emits a light beam in a blue wavelength range is an extremely small surface area light emitting diode, the light emitting element which emits a light beam in a green wavelength range is a second harmonic generation laser, and the light emitting element which emits a light beam in a red wavelength range is a semiconductor laser.

8. A light beam scanning device according to claim 3, wherein the light emitting element which emits a light beam in a blue wavelength range is a GaN semiconductor laser, the light emitting element which emits a light beam in a green wavelength range is an extremely small surface area light emitting diode, and the light emitting element which emits a light beam in a red wavelength range is a semiconductor laser.

9. A light beam scanning device according to claim 3, wherein the light emitting element which emits a light beam in a blue wavelength range and the light emitting element which emits a light beam in a green wavelength range are extremely small surface area light emitting diodes, and the light emitting element which emits a light beam in a red wavelength range is a semiconductor laser.

10. A light beam scanning device according to claim 3, wherein:

at least one of said plurality of light emitting elements comprises one of an He—Ne laser and an argon laser.

11. A light beam scanning device according to claim 3, wherein the light emitting element which emits a light beam in a blue wavelength range is a semiconductor laser having an oscillation wavelength of 410 nm, the light emitting element which emits a light beam in a green wavelength range is an edge emission-type light emitting diode, and the light emitting element which emits a light beam in a red wavelength range is a semiconductor laser having an oscillation wavelength of 680 nm.

12. A light beam scanning device according to claim 3, wherein said scanning means comprises one of a polygon mirror, a galvano mirror, and a micromirror array.

13. A light beam scanning device according to claim 1, wherein the photosensitive material is a silver halide photosensitive material.

14. A light beam scanning device according to claim 1, wherein:

said photosensitive material comprises a blue-sensitive photosensitive layer, a green-sensitive photosensitive layer, and a red-sensitive photosensitive layer, a spectral sensitivity of said blue-sensitive photosensitive layer is greater than a spectral sensitivity of said green-sensitive photosensitive layer and greater than a spectral sensitivity of said red-sensitive photosensitive layer, and said spectral sensitivity of said green-sensitive photosensitive layer is greater than said spectral sensitivity of said red-sensitive photosensitive layer.

15. A method of scanning a plurality of light beams over a photosensitive material, comprising:

modulating a plurality of light emitting elements that respectively emit the plurality of light beams, wherein at least one of said plurality of light emitting elements is an extremely small surface area light emitting diode having a surface area of a light emitting region from 0.1 $\mu m^2$ to 64 $\mu m^2$;

directing said emitted light beams through a plurality of collimating lenses, beam correction optical systems, and cylindrical lenses;

reflecting said emitted light beams off a mirror array; and directing said emitted light beams from the mirror array and scanning said emitted light beams across the photosensitive material.

* * * * *